United States Patent
Wei et al.

(10) Patent No.: US 11,665,556 B2
(45) Date of Patent: May 30, 2023

(54) LOGICAL CHANNEL DATA PACKET TRANSMISSION METHOD AND WIRELESS COMMUNICATION SYSTEM

(71) Applicant: FG INNOVATION COMPANY LIMITED, Tuen Mun (HK)

(72) Inventors: Chia-Hung Wei, Hsinchu (TW); Chie-Ming Chou, Hsinchu (TW)

(73) Assignee: FG INNOVATION COMPANY LIMITED, Tuen Mun (HK)

( * ) Notice: Subject to any disclaimer, the term of this patent is extended or adjusted under 35 U.S.C. 154(b) by 0 days.

(21) Appl. No.: 15/942,552

(22) Filed: Apr. 1, 2018

(65) Prior Publication Data
US 2018/0288631 A1    Oct. 4, 2018

Related U.S. Application Data

(60) Provisional application No. 62/480,515, filed on Apr. 2, 2017.

(51) Int. Cl.
*H04W 24/02* (2009.01)
*H04L 5/00* (2006.01)
(Continued)

(52) U.S. Cl.
CPC ........... *H04W 24/02* (2013.01); *H04L 5/0046* (2013.01); *H04L 67/61* (2022.05); *H04L 69/22* (2013.01)

(58) Field of Classification Search
CPC ...... H04W 24/02; H04L 67/322; H04L 69/22; H04L 5/0046
See application file for complete search history.

(56) References Cited

U.S. PATENT DOCUMENTS

2015/0131578 A1    5/2015  Baek et al.
2016/0234714 A1*   8/2016  Basu Mallick ... H04W 28/0278
(Continued)

FOREIGN PATENT DOCUMENTS

CN    104782223 A    7/2015
CN    105580422 A    5/2016
(Continued)

OTHER PUBLICATIONS

Babaei, U.S. Appl. No. 62/475,600,Specification,Mar. 23, 2017 (Year: 2017).*

(Continued)

*Primary Examiner* — Yu-Wen Chang
(74) *Attorney, Agent, or Firm* — Finnegan, Henderson, Farabow, Garrett & Dunner, L.L.P.

(57) ABSTRACT

A logical channel data packet transmission method for a user equipment (UE) is provided. The UE includes a processor configured to perform the following instructions. A packet data control protocol (PDCP) packet data unit (PDU) is duplicated to generate a first PDCP PDU and a second PDCP PDU in a PDCP entity. The first PDCP PDU is transmitted to a first radio link control (RLC) bearer. The second PDCP PDU is transmitted to a second RLC bearer. A first RLC PDU is generated in response to the first PDCP PDU in the first RLC bearer. A second RLC PDU is generated in response to the PDCP PDU in the second RLC bearer. The first RLC PDU and the second RLC PDU are received in a medium access control (MAC) entity associated to the first and second RLC bearers.

12 Claims, 10 Drawing Sheets

(51) Int. Cl.
*H04L 69/22* (2022.01)
*H04L 67/61* (2022.01)

(56) References Cited

U.S. PATENT DOCUMENTS

| | | | |
|---|---|---|---|
| 2016/0286412 A1* | 9/2016 | Kim | H04W 76/15 |
| 2017/0006484 A1 | 1/2017 | Lee et al. | |
| 2018/0098250 A1* | 4/2018 | Vrzic | H04W 36/18 |
| 2018/0132220 A1* | 5/2018 | Jang | H04L 1/08 |
| 2018/0139030 A1* | 5/2018 | Kim | H04L 5/0042 |
| 2018/0206213 A1* | 7/2018 | Kim | H04L 69/22 |
| 2018/0219791 A1* | 8/2018 | Yu | H04L 29/06 |
| 2018/0270021 A1* | 9/2018 | Ye | H04L 1/1819 |
| 2018/0279163 A1* | 9/2018 | Wu | H04W 76/14 |
| 2018/0279173 A1* | 9/2018 | Loehr | H04W 28/065 |
| 2018/0279262 A1* | 9/2018 | Babaei | H04L 1/00 |
| 2018/0279358 A1* | 9/2018 | Babaei | H04W 72/0453 |
| 2018/0317130 A1* | 11/2018 | Jin | H04W 76/27 |
| 2019/0268799 A1* | 8/2019 | Hong | H04W 40/04 |
| 2019/0327641 A1* | 10/2019 | Mok | H04W 76/27 |
| 2020/0015120 A1* | 1/2020 | Lin | H04L 5/0094 |
| 2020/0022106 A1* | 1/2020 | Kim | H04W 16/28 |
| 2020/0029379 A1* | 1/2020 | Xiao | H04L 1/22 |
| 2020/0037151 A1* | 1/2020 | Du | H04L 1/22 |
| 2020/0037345 A1* | 1/2020 | Ryoo | H04W 72/1284 |
| 2020/0092746 A1* | 3/2020 | Baek | H04W 80/08 |
| 2021/0345175 A1* | 11/2021 | Shi | H04W 28/06 |
| 2022/0022244 A1* | 1/2022 | Zhao | H04W 72/14 |

FOREIGN PATENT DOCUMENTS

| | | |
|---|---|---|
| CN | 105659690 A | 6/2016 |
| WO | WO 2015133767 A1 | 9/2015 |
| WO | 2018171734 A1 | 9/2018 |

OTHER PUBLICATIONS

62471935,Specification,Mar. 15, 2017 (Year: 2017).*
3GPP TS 36.321 V13.4.0 (Year: 2017).*
OPPO MAC operation on the duplicated data from PDCP layer R2-1702546 Mar. 24, 2017(Mar. 24, 2017), section 2.
Ericsson Controlling of duplication in case of CA R2-1702753 Mar. 25, 2017(Mar. 25, 2017), section 2.
Extended European Search Report dated Dec. 11, 2020 in European Application 18775472.6.
Huawei, "Solution for Selection of Network Slice and CN entity," 3GPP Draft: R3-162460 CN Entity Selection 3rd Generation Partnership Project (3GPP), Mobile Competence Centre; 650, Route Des Lucioles; F-06921, Sophia-Antipolis Cedex, France, Oct. 10-14, 2016, vol. RAN WG3, Sep. 30, 2016, XP051163046.
ZTE, "Some Issues with NW Slicing in Multiple Connectivity Contexts," 3GPP Draft; R3-162122 Some Issues with NW Slicing in Multiple Connectivity Contexts V3, 3rd Generation Partnership Project (3GPP), Mobile Competence Centre 350, Route Des Lucioles; F-06921, Sophia-Antipolis Cedex, France, Oct. 10-14, 2016, vol. RAN WG3, Oct. 6, 2016, XP051151783.
ZTE, "Consideration on RRM and signaling procedure for LTE NR tight interworking," 3GPP Draft; R2-1700150 Consideration on RRM and signaling procedure for LTE NR tight interworking, 3rd Generation Partnership Project (3GPP), Mobile Competence Centre; 650, Route Des Lucioles; F-06921, vol. TSG RAN, Spokane USA; Jan. 17, 2017-Jan. 19, 2017, Jan. 7, 2017, XP051203857.
China National Intellectual Property Administration, Notice of Allowance for China Application No. 201880021281.5, dated Jan. 28, 2023.
MediaTek Inc., "PDCP configuration for packet duplication", 3GPP TSG-RAN WG2 Meeting 97bis, R2-1703527, Spokane, USA, Apr. 3-7, 2017.
MediaTek Inc., "MAC modeling for PDCP duplication in CA", 3GPP TSG-RAN WG2 Meeting 97bis, R2-1703528, Spokane, USA, Apr. 3-7, 2017.
Ericsson, "Data duplication and link selection for URLLC in NR", 3GPP TSG-RAN WG2 #AH, R2-1700428, Spokane, USA, Jan. 17-19, 2017.
Nokia, Alcatel-Lucent Shanghai Bell, "Overview of Duplication Operation", 3GPP TSG-RAN WG2 Meeting 97bis, R2-1702632, Spokane, USA, Apr. 3-7, 2017.
Nokia, Alcatel-Lucent Shanghai Bell, "Duplication Impacts to MAC", 3GPP TSG-RAN WG2 Meeting 97bis, R2-1702639, Spokane, USA, Apr. 3-7, 2017.
LG Electronics Inc., "Configurability of packet duplication in PDCP", 3GPP TSG-RSN WG2 Meeting 97bis, R2-1703509, Spokane, USA, Apr. 3-7, 2017.
Samsung, "Considerations on Packet Duplication for URLLC", 3GPP TSG-RAN WG2 Meeting 97bis, R2-1701986, Athens, Greece, Feb. 13-17, 2017.

* cited by examiner

LOGICAL CHANNEL DATA PACKET TRANSMISSION METHOD AND WIRELESS COMMUNICATION SYSTEM

CROSS REFERENCE

This application claims the benefit and priority to of U.S. Provisional Application Ser. No. 62/480,515, filed on Apr. 2, 2017, and entitled "LOGICAL CHANNEL PRIORITIZATION SUPPORTING MULTIPLE TRANSMISSION TIME INTERVALS", which is incorporated herein by reference in its entirety.

TECHNICAL FIELD

The present disclosure generally relates to logical channel data transmission method and wireless communication system.

BACKGROUND

In fourth generation (4G) wireless communication systems (e.g., long term evolution (LTE), evolved LTE (eLTE), or LTE-Advanced (LTE-A)), data transmission between a user equipment (UE) and a base station is carried via radio access bearers. Since the UE may perform several applications simultaneously, with each application generating data for transmission with different Quality of Service (QoS) requirements, the UE can establish multiple radio access bearers with the base station for transmitting data with different QoS requirements. In the next generation (e.g., 5G) wireless communication networks, sometimes also referred to as New Radio (NR), a logical channel may be mapped to different numerologies (e.g., multiple Transmission Time Intervals (TTIs) and/or sub-carrier spacings). In order to support diverse use cases, (e.g., enhanced mobile broadband (eMBB), massive machine type communications (mMTC), and ultra-reliable low latency communications (URLLC)), which have a greater variety of quality of service (QoS) requirements than the 4G wireless networks, the physical layer of a UE in the NR wireless networks needs to provide more flexibility to support multiple numerologies. For example, URLLC with ultra low latency requirements may benefit from transmitting data with short TTIs, while eMBB communications may focus on achieving high throughputs and not so stringent on short TTI requirements. Since the UE may perform several applications simultaneously in a NR wireless network, with each application generating data for transmission with different QoS requirements and different TTIs, it is desirable for a single media access control (MAC) layer to support one or more numerologies, and a radio bearer/logical channel that can be mapped to multiple numerologies (e.g., TTI durations).

SUMMARY

In one aspect of the present disclosure, a user equipment (UE) is provided. The UE includes a processor configured to perform the following instructions. A packet data control protocol (PDCP) packet data unit (PDU) is duplicated to generate a first PDCP PDU and a second PDCP PDU in a PDCP entity. The first PDCP PDU is transmitted to a first radio link control (RLC) bearer. The second PDCP PDU is transmitted to a second RLC bearer. A first RLC PDU is generated in response to the first PDCP PDU in the first RLC bearer. A second RLC PDU is generated in response to the PDCP PDU in the second RLC bearer. The first RLC PDU and the second RLC PDU are received in a medium access control (MAC) entity.

In another aspect of the present disclosure, a data packet transmission method is provided. The data packet transmission method includes the following steps. A packet data control protocol (PDCP) packet data unit (PDU) is duplicated to generate a first PDCP PDU and a second PDCP PDU in a PDCP entity. The first PDCP PDU is transmitted to a first radio link control (RLC) bearer. The second PDCP PDU is transmitted to a second RLC bearer. A first RLC PDU is generated in response to the first PDCP PDU in the first RLC bearer. A second RLC PDU is generated in response to the second PDCP PDU in the second RLC bearer. The first RLC PDU and the second RLC PDU are received in a medium access control (MAC) entity.

DETAILED DESCRIPTION

Figure 1A:
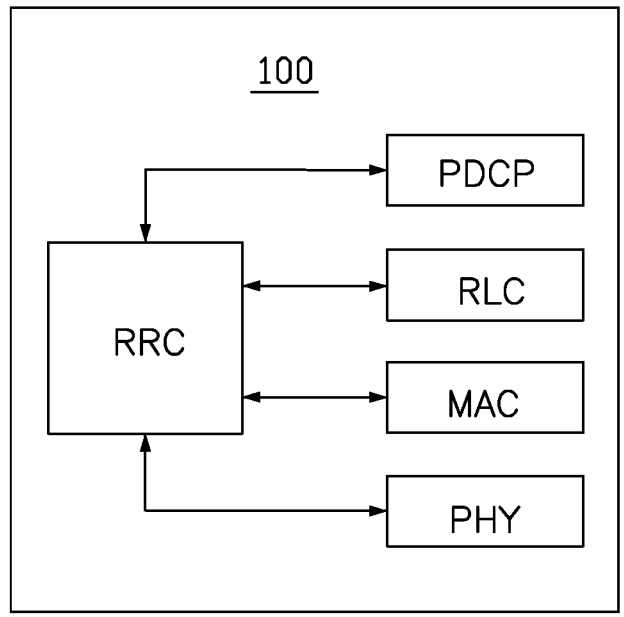
FIG. 1A is a schematic diagram of a protocol stack of a user equipment.

The following description contains specific information pertaining to exemplary embodiments in the present disclosure. The drawings in the present disclosure and their accompanying detailed description are directed to merely exemplary embodiments. However, the present disclosure is not limited to merely these exemplary embodiments. Other variations and embodiments of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

FIG. 1A is a schematic diagram of a protocol stack (e.g., user-plane protocol stack having Layer 2 sublayers) of a UE. As shown in FIG. 1A, protocol stack 100 includes a packet data control protocol (PDCP) layer, a radio link control (RLC) layer, a medium access control (MAC) layer, a physical (PHY) layer, and a resource control (RRC) layer, where the RRC layer may control each of the PDCP layer, the RLC layer, the MAC layer and the PHY layer. Among other functions, the MAC layer is responsible for mapping between logical channels and transport channels, prioritization of the logical channels, and multiplexing of MAC service data units (SDUs) from one or more logical channels onto transport blocks to be delivered to the physical layer on transport channels.

Figure 1B:
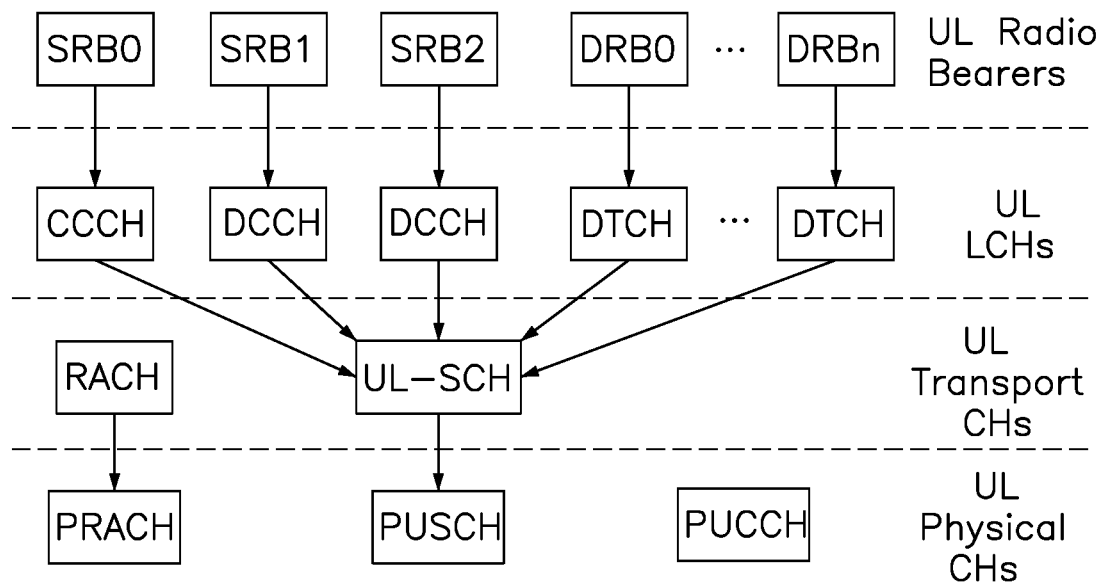
FIG. 1B is a schematic diagram of associated channels of the layers shown in FIG. 1A.

FIG. 1B is a schematic diagram of associated channels of the layers shown in FIG. 1A. As illustrated in FIG. 1B, for uplink (UL) operations, each radio barrier maps onto a separate logical channel (i.e., on a one-on-one basis). Signaling Radio Bearers (SRBs) carry control-plane signaling messages and Data Radio Bearers (DRBs) carry data-plane data messages. For example, SRB0 corresponds with a Common Control Channel (CCCH), which is used only when the UE does not have a regular connection with a Dedicated Control Channel (DCCH). SRB1 and SRB2 map onto two respective DCCHs. For example, SRB1 may be used to carry control-plane messages originating from the RRC layer, and SRB2 may be used to carry control-plane messages originating from a Non-Access Stratum (NAS) layer. In addition, Data Radio Bearers (e.g., DRB0 through DRBn) may carry user-plane traffic. A separate Dedicated Traffic Channel (DTCH) is set up for each active DRB. As illustrated in FIG. 1B, the uplink logical channels (UL LCHs) map to an Uplink Shared Channel (UL-SCH) at the UL Transport Channel Level, which in turn maps to a Physical Uplink Shared Channel (PUSCH) at the UL Physical Channel Level.

As also illustrated in FIG. 1B, a Random Access Channel (RACH) transport channel maps to a Physical Random Access Channel (PRACH) physical channel for performing random accesses, and a Physical Uplink Control Channel (PUCCH) carries physical layer signaling to a base station, such as an evolved Node B (eNB). In uplink carrier aggregation, there may be a separate PUSCH for each individual uplink carrier, although only one PUSCH is shown in FIG. 1B.

Figure 2:
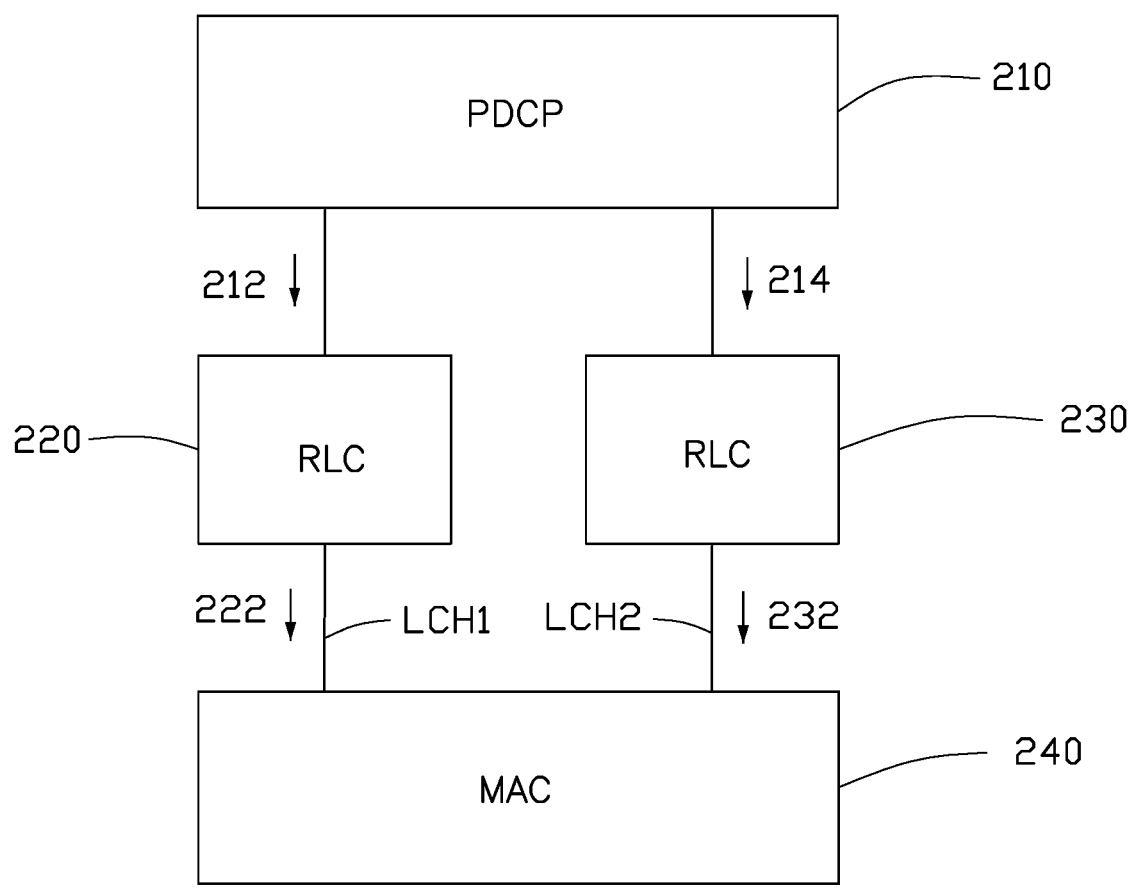
FIG. 2 is a schematic diagram of a portion of a protocol stack of a UE according to an exemplary implementation of the present disclosure.

FIG. 2 is a schematic diagram of a protocol stack 200 of a UE according to an exemplary implementation of the present disclosure. In this embodiment, in order to achieve higher reliability on data packet transmission, a UE duplicates the data packet in the PDCP entity with split RLC bearers, and transmit the duplicated data packets via different carriers and/or different base stations. In order to provide URLLC service, the UE may duplicate a data packet and place them in different SDUs for transmission.

As shown in FIG. 2, the protocol stack 200 includes a PDCP entity 210, two RLC entities 220 and 230, a MAC entity 240, a PHY entity (not shown), and the RRC entity (not shown). The UE includes a processor configured to perform the following instructions. A PDCP packet data unit (PDU) is duplicated into split RLC bearers in the PDCP entity 210. For example, the first RLC bearer is configured with RLC entity 220, associated logical channel LCH1 and association to the PDCP entity, and the second RLC bearer is configured with RLC entity 230, associated logical channel LCH2 and association to the PDCP entity. When the duplication function is activated, the PDCP PDU are duplicated to generate PDCP PDUs 212 and 214, and these duplicated data packets are processed with two different logical channels (e.g., LCH1 and LCH2). For example, PDCP PDU 212 is transmitted to RLC entity 220 via the first RLC bearer, and PDCP PDU 214 is transmitted to RLC entity 230 via the second RLC bearer. RLC PDU 222 is generated in response to PDCP PDU 212 in RLC entity 220. RLC PDU 232 is generated in response to PDCP PDU 214 in RLC entity 230. RLC PDUs 222 and 232 are received in MAC entity 240 via the LCH1 and LCH2 respectively.

In one embodiment, two or more duplicated data packets are identified, so that the MAC entity does not pack the two or more duplicated data packets into a single MAC PDU, for example, to ensure reliability. In one embodiment, the duplicated data packets are identified according to a logical channel ID and a duplication indicator in the MAC entity. The duplication indicator indicates whether the duplication function is activated or not, which may be pre-configured or received from a base station. In one embodiment, the duplication indicator is a duplication function on/off indication. In another embodiment, the duplication indicator is a flag bit in a MAC header. The logical channel ID may be configured by a base station. When the duplication indicator indicates that the duplication function is activated, the PDCP PDU is duplicated in the PDCP entity and transmitted to split RLC bearers for generating the two RLC data packets (e.g., RLC PDUs 222 and 232). After the two RLC data packets are received from the two RLC bearers associated with their logical channel IDs, the duplicated data packets (e.g., RLC PDU 222 and RLC PDU 232) may be identified in the MAC entity 240.

In one embodiment, when the radio resource allocated by the based station for data transmission is limited, the data transmissions from all bearers may need to be prioritized. The prioritization work in the 4G wireless network systems is referred to as Logical Channel Prioritization (LCP). The RRC layer controls the scheduling of uplink data by signaling LCP related parameters for each logical channel. The LCP related parameters include, but are not limited to, a prioritized bit rate (PBR), a bucket size duration (BSD), and a logical channel priority. The LCP related parameters are determined or assigned by a base station, and sent to the UE to configure logical channel resources for UL transmission.

In one implementation, a base station (e.g., gNB or eNB) may assign only a single set of LCP related parameters (e.g., LCH priority, PBR, BSD, TTI) for the two logical channels. The UE maintains only one token bucket (e.g., a shared token bucket) for the split RLC bearers in response to the set of LCP parameters and processes the LCP for these two logical channels (e.g., LCH1 and LCH2) accordingly. For example, the UE manage the usage of tokens from the single token bucket for the duplicated data packets. In one embodiment, the PDCP entity marks the PDCP PDUs so that the duplicated data packets are identified in the MAC entity. As such, during the MAC SDU packing operation, the MAC layer can avoid packing the duplicated data packets into a single MAC PDU. Otherwise, the duplicated data packets would be delivered in the same MAC PDU through the same carrier, which is undesirable for URLLC. In another embodiment, the duplicated data packets are identified according to their logical channel IDs and the duplication indicator. The duplication indicator includes a PDCP PDU duplication function on/off indication from upper layer or base station, and/or a flag bit in the MAC header.

In another implementation, a base station (e.g., gNB or eNB) may assign only a single set of LCP related parameters (e.g., LCH priority, PBR, BSD, TTI) for the two logical channels (e.g., LCH1 and LCH2), while the UE maintains two or more token buckets for each of the split RLC bearers in response to the set of LCP parameters and processes the LCP for these two logical channels (e.g., LCH1 and LCH2) in response to the respective token buckets accordingly.

In yet another implementation, the base station (e.g., gNB or eNB) may assign two independent sets of LCP related parameters (e.g., LCH priority, PBR, BSD, TTI) for the two logical channels (e.g., LCH1 and LCH2), where the LCP parameters are mapped to their respective split RLC bearers. In this case, the UE maintains two token buckets for the respective split RLC bearers in response to the two sets of LCP parameters and processes the LCP for these two logical channels (e.g., LCH1 and LCH2) in response to the respective token buckets accordingly.

For data packet duplication operated by dual connectivity cases, a master base station (e.g., a Master gNB (MgNB)) is responsible for coordinating with a secondary base station (e.g., a secondary gNB (SgNB)), and transmitting the associated LCP parameters (e.g., LCH priority, PBR, BSD, TTI) to the UE. In some implementations, it is assumed that there must be a base station serving as a master base station that supports such kind of dual-connectivity operation. The detailed LCP procedure for the two logical channels (e.g., LCH1 and LCH2) is described below.

Figure 3:
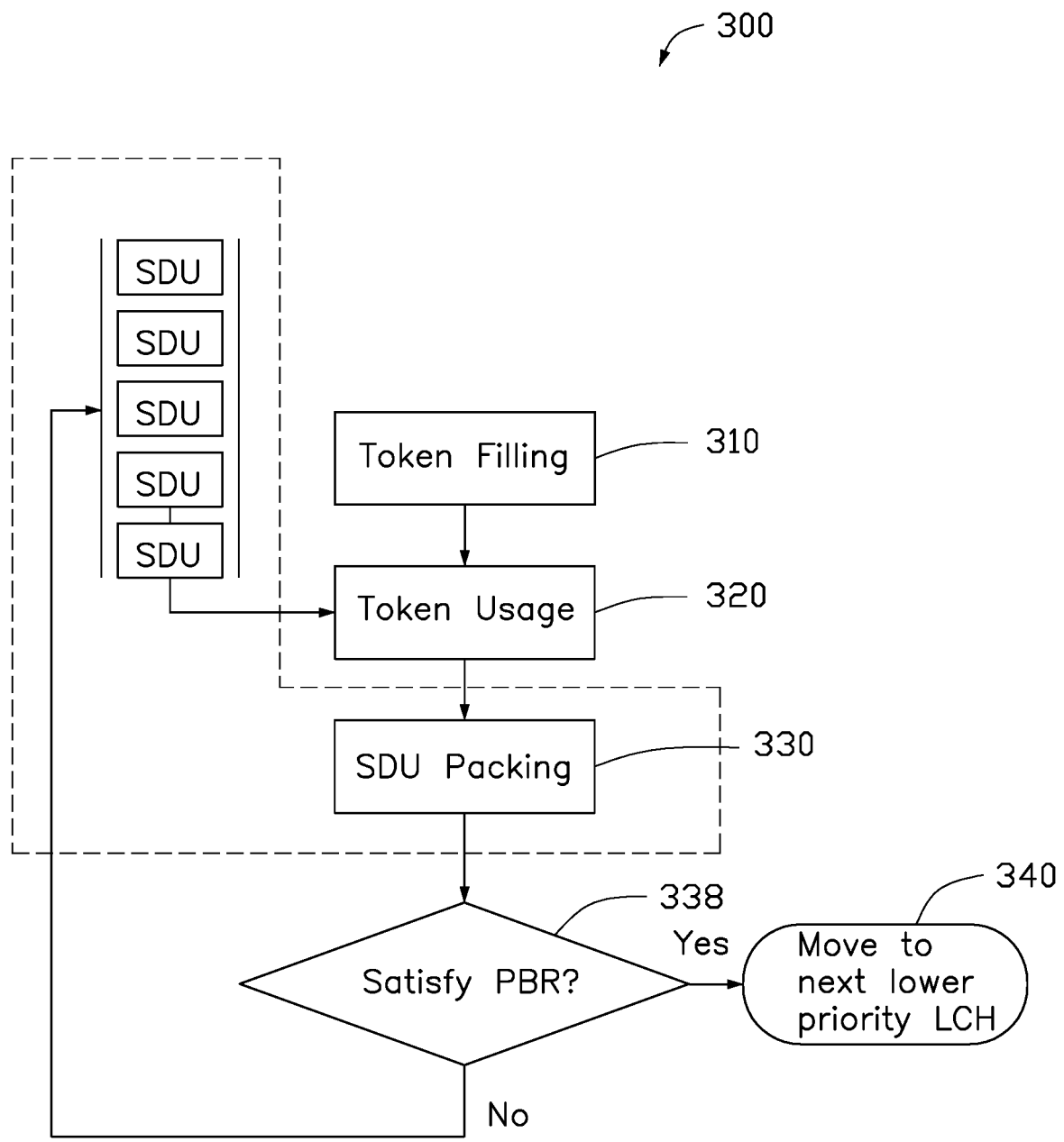
FIG. 3 is a diagram illustrating an LCP operation in the MAC layer of a UE, according to an exemplary implementation of the present application.

An LCP operation performed in the MAC layer of a UE under a wireless communication system is shown in FIG. 3. LCP operation 300 may include token filling 310, token usage 320, and SDU packing 330. The MAC layer may prioritize and allocate resources to the logical channels in the steps shown in FIG. 3. In token filling 310, tokens are filled in a token bucket (not explicitly shown). The total number of tokens in the token bucket may increase or decrease for each transmission time interval depending on the token filling rate and the rate at which the tokens are consumed by the logical channel, for example, for UL transmission. In token usage 320, when there are tokens in the token bucket and SDUs in the MAC layer SDU buffer, the logical channel will serve the MAC SDUs with the corresponding amount (e.g., equal amount) of tokens in the token bucket, hence consuming or using the tokens in the token bucket. SDU packing 330 includes packing MAC SDUs into a MAC PDU. In step 338, the UE determines whether the PBR of the logical channel j is satisfied. If the PBR of the logical channel is not satisfied, the LCP operation 300 goes back to the MAC layer SDU buffer and pack additional SDUs as long as there are tokens available in the token bucket until the PBR is satisfied (e.g., the total size of the packed MAC SDU matches the PBR). When the PBR of the logical channel is satisfied, in step 340, the MAC layer starts to perform resource allocation procedure for the next logical channel with a lower priority than the current logical channel.

In LTE system, the operations of token filling and token usage in the LCP is designed based on a single TTI with a constant duration. It means that, in LTE, the LCP related parameters are assigned based on a per UE and per LCH basis, and only a single TTI duration is configured for each physical uplink shared channel (PUSCH).

In some embodiments, various LCP mechanisms related to multiple numerologies are supported, where a logical channel (LCH) is configured with multiple numerologies (e.g., TTIs). Various LCP mechanisms in token filling, token usage and SDU packing for supporting multiple numerologies are discussed in details below.

Although the present application describes that a logical channel may be configured with two numerologies (e.g., TTIs), implementations of the present application are not limited to two numerologies per logical channel. All of the LCP mechanisms discussed below can be logically extended to a logical channel having more than two numerologies.

According to implementations of the present application, the TTIs may be configured by their corresponding base stations (e.g., the next generation Node Bs (gNBs) and/or evolved Node Bs (eNBs)), and can be dynamically adjusted. The TTI duration in each numerology may be different.

In the token filling operation of the LCP operation, when the logical channel is configured with two or more numerologies, each numerology may result in different TTI, and the token filling speed associated with each numerology is different due to the difference in the TTI length. In addition, the PBR for each numerology may be configured independently of one another. When the logical channel is configured with two or more numerologies, the token filling operation may be discussed in two sub-categories, namely, token filling with a shared token bucket and token filling with isolated token buckets.

Figure 4:
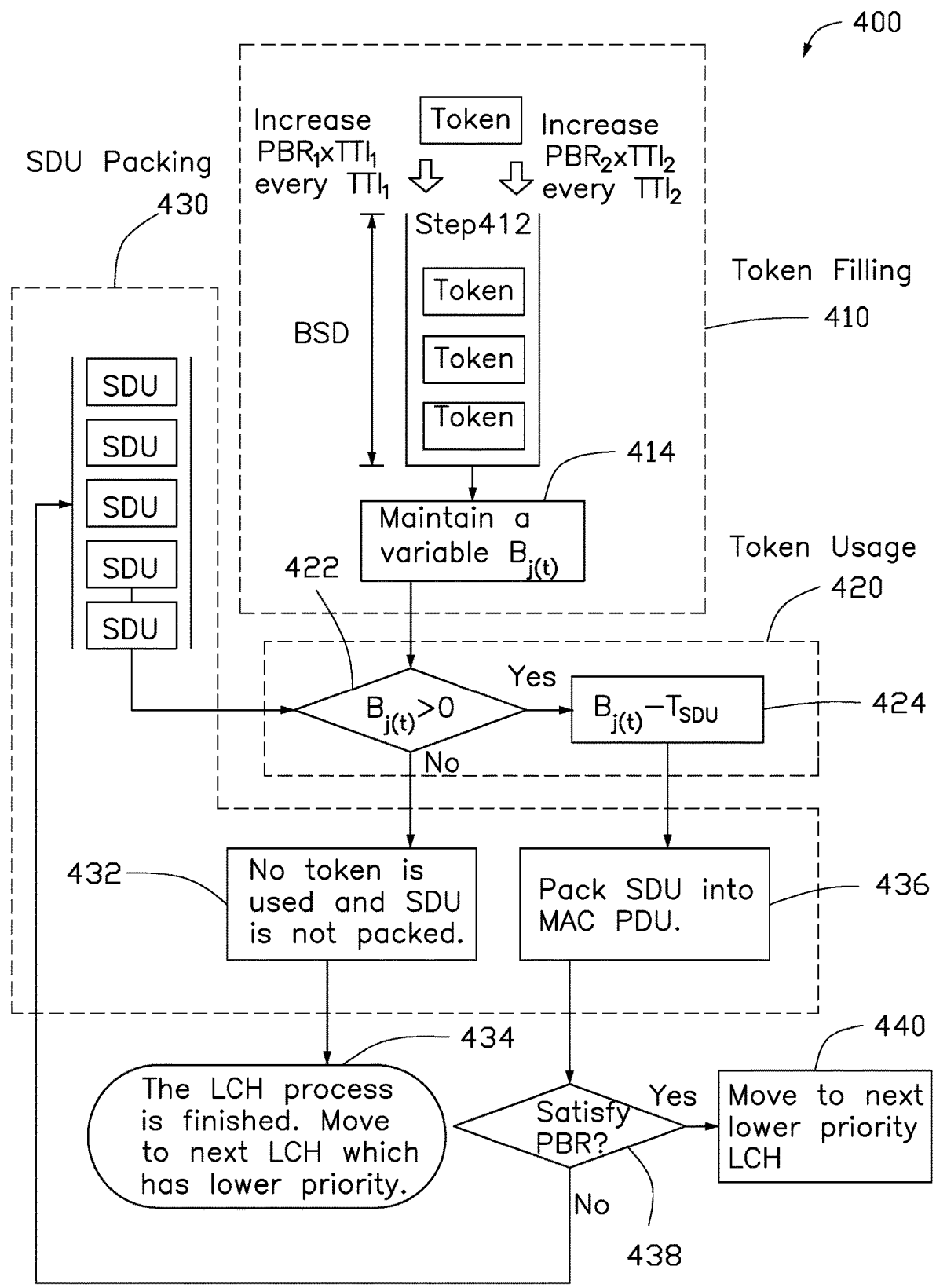
FIG. 4 is a diagram illustrating an LCP operation utilizing token filling with a shared token bucket, according to an exemplary implementation of the present application.

FIG. 4 is a schematic diagram of an LCP operation utilizing token filling with a shared token bucket, according to an implementation of the present application. LCP operation 400 may include token filling 410, token usage 420, and SDU packing 430.

The MAC layer may prioritize and allocate resources to the logical channels in the steps shown in FIG. 4. It should be understood that, although LCP operation 400 only shows the various steps performed in a logical channel (e.g., logical channel j), LCP operation 400 in the MAC layer may include multiple logical channels with different priorities. The steps of these other logical channels are substantially similar to the steps shown in FIG. 4, thus omitted from FIG. 4 for conceptual clarity.

Token filling 410 may include step 412 and 414. In step 412, a UE maintains a shared token bucket for each logical channel in response to the LCP parameters assigned by the base station. For example, the UE maintains a bucket size of a logical channel. The bucket size of a logical channel may be equal to PBR×BSD. As shown in FIG. 4, when a base station (e.g., gNB or eNB) assigns two or more TTIs (e.g., $TTI_1$ and $TTI_2$) and two or more corresponding PBRs (e.g., $PBR_1$ and $PBR_2$) for each logical channel to the UE. The UE may apply $PBR_1$ for $TTI_1$ and $PBR_2$ for $TTI_2$ accordingly, and use a shared token bucket for the two TTIs. For every logical channel, the TTIs and their respective PBR may be different, and thus the token filling rate for each logical channel may be different. In the present implementation, the two TTIs perform their own token filling operations independently by increasing $PBR_n \times TTI_n$ tokens into the shared token bucket at their respective $TTI_n$, where n is the numerology numbering.

In step 414, for each logical channel, the MAC layer maintains a variable $B_j(t)$, which is the total number of tokens of logical channel j. The value of variable $B_j(t)$ may be initialized to zero when the related logical channel is established, and may vary with time (t). For example, the total number of tokens in the shared token bucket for logical channel j, can be expressed as $B_j(t)=B_{j(t-1)}+(PBR_1 \times TTI_1)+(PBR_2 \times TTI_2)$. It should be noted that the value of $B_{j(t)}$ should never exceed the maximum bucket size. If the value of $B_{j(t)}$ is greater than the bucket size of logical channel j, $B_{j(t)}$ shall be capped at the maximum bucket size (e.g., PBR×BSD). It should be understood that, a high PBR may lead to more data being packed. For instance, if the QoS for a particular application is high, the base station may set the PBR high, so that the data can be packed faster. Although FIG. 4 only shows token filling operation of one logical channel, it should be understood that the UE may have multiple logical channels performing substantially similar functions as logical channel j. In the present implementation, $PBR_1$ and $TTI_1$, and $PBR_2$ and $TTI_2$, are configured by the base station. Having a shared token bucket may reduce the complexity in the architecture of the MAC layer and the computation overhead of the UE. In one implementation, each logical channel may have different combination of $PBR_n$ and $TTI_n$.

Token usage 420 may include step 422 and 424. In step 422, the UE determines whether the total number of tokens in the token bucket of the logical channel j ($B_{j(t)}$) is greater than zero. When the total number of tokens in the token bucket of the logical channel j is greater than zero (i.e., $B_{j(t)}>0$), the LCP operation performs step 424.

In step 424, the token is used. It means that the token bucket of the logical channel j consumes corresponding amount of tokens $T_{SDU}$. For example, the total number of tokens $B_{j(t)}$ is decreased in the MAC entity by the total size of MAC SDUs served to logical channel j in step 412. In one embodiment, all the logical channels with $B_{j(t)}>0$ are allocated resources in a decreasing priority order. If the PBR of a logical channel is set to infinity ($\infty$), the MAC layer allocates resources for all the data available for transmission on the logical channel before meeting the PBR of the lower priority logical channel(s). In step 436, token $T_{SDU}$ of the corresponding SDU are packed into a MAC PDU.

One the other hand, when the total number of tokens in the token bucket of the logical channel j is less than or equal to zero, the LCP operation performs steps 432 and 434. In step 432, when the total number of tokens in the token bucket of the logical channel j is not greater than zero, no token will be used, and the SDU from this logical channel will not be packed into the MAC PDU in this round. In step 434, the MAC layer starts a resource allocation procedure for another logical channel that has a priority lower than that of the logical channel j.

In step 438, the UE determines whether the PBR of the logical channel j is satisfied. If the PBR of the logical channel j is not satisfied, LCP operation 400 proceeds to SDU packing 430 to pack additional SDUs following the same rules until the PBR is satisfied (e.g., the total size of the packed MAC SDUs in step 422 matches the PBR in step 438). When the PBR of the logical channel j is satisfied, in step 440, the MAC entity starts a resource allocation procedure for the next logical channel with a lower priority than logical channel j.

Figure 5:
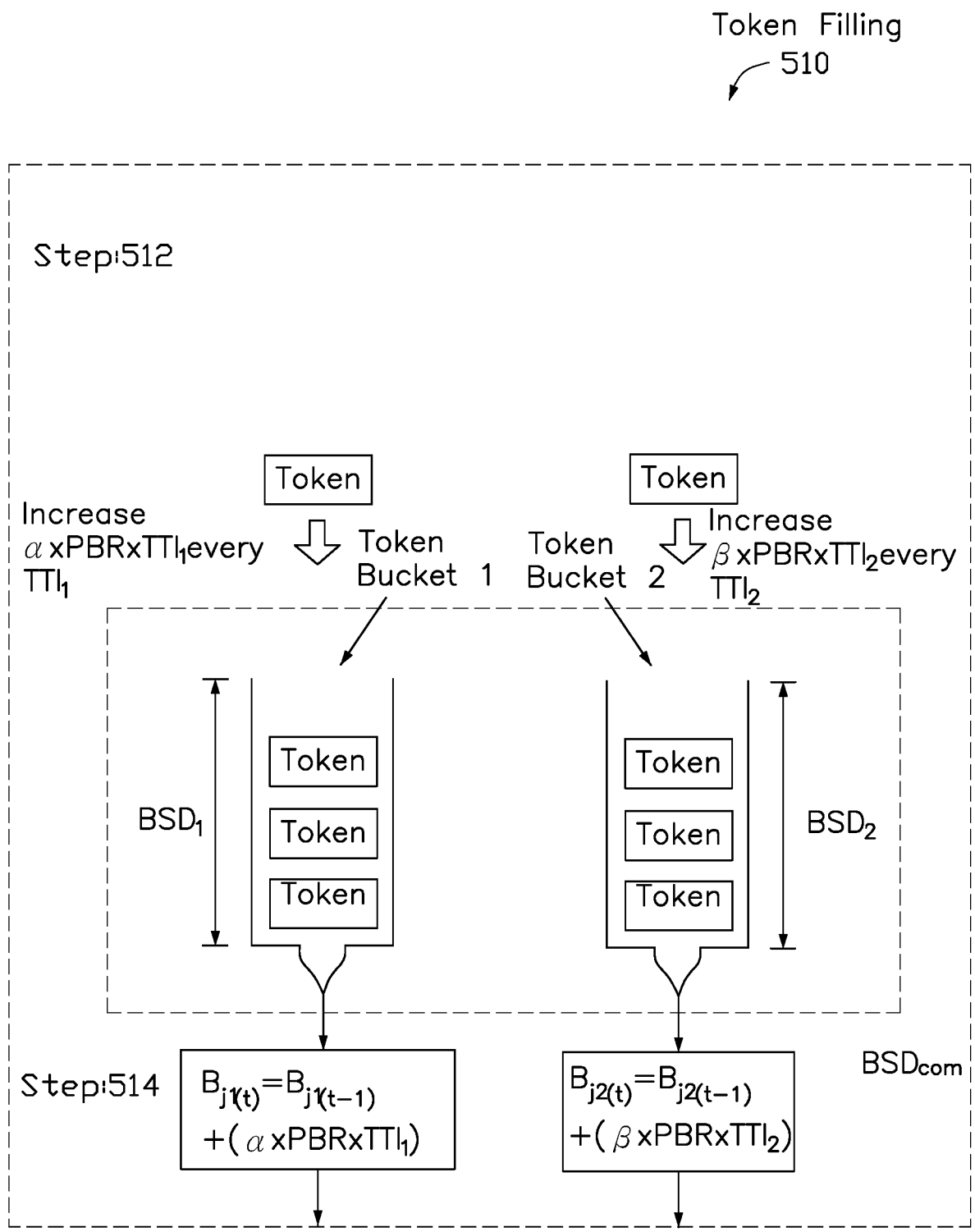
FIG. 5 is a diagram illustrating isolated token filling with a single PBR configuration, according to an exemplary implementation of the present application.
Figure 6:
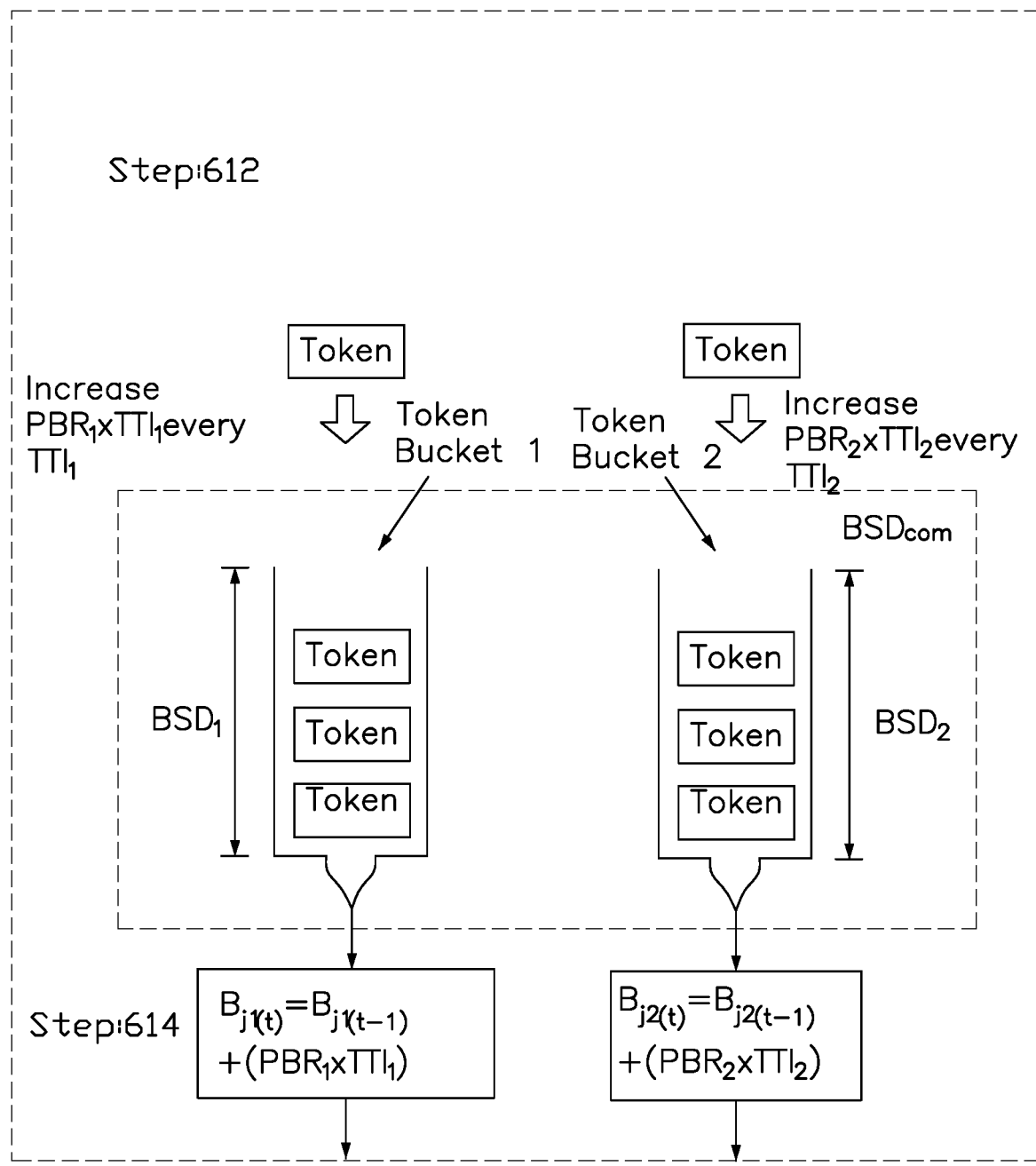
FIG. 6 is a diagram illustrating isolated token filling with two single PBR configuration, according to an exemplary implementation of the present application.

FIGS. 5 and 6 are schematic diagrams of token filling with isolated token buckets, according to implementations of the present application. In contrast to token filling with a shared token bucket, when a base station (e.g., gNB or eNB) assigns two or more TTIs (e.g., $TTI_1$ and $TTI_2$) for each logical channel to a UE, the UE may apply two PBRs (e.g., $PBR_1$ and $PBR_2$) assigned by base station for the two TTIs accordingly, and use an isolated token bucket for each TTI, where each isolated token bucket has its own bucket size $BSD_n$, where n is the numerology numbering, j is the logical channel numbering. In this embodiment, the isolated token buckets are differentiated by TTI. In some embodiments, the isolated token buckets are differentiated by other numerologies.

As shown in FIGS. 5 and 6, the two TTIs perform their own token filling operations independently by increasing $PBR_n \times TTI_n$ tokens into their respective isolated token buckets at their respective $TTI_n$, where n is the numerology numbering. However, based on the generation method of $PBR_1$ and $PBR_2$, token filling with isolated token buckets can be further categorized into two sub-categories, namely, a single PBR configuration for both token buckets (e.g., FIG. 5) and an isolated/independent PBR configuration for each isolated token bucket (e.g., FIG. 6).

It should be noted that, in one implementation, the base station may signal two or more $BSD_n$ corresponding to the two or more $TTI_n$ for each of the isolated token buckets during configuration. In another implementation, the base station may signal a single BSD for all isolated token buckets, and the UE may apply two or more scaling factors with respect to each of the different numerologies. In one embodiment, the bucket size of a logical channel may be equal to PBR×BSD. For example, when the subcarrier spacing is 15 kHz, TTI is 1 ms. Taking PBR is 128 kB/s, BSD is 100 ms, as an example, token increases at 128 kB/s×1 ms=128B/TTI, and then the bucket size of the logical channel is 128 kB/s×100 ms=12.8 kB.

FIG. 5 is a schematic diagram of isolated token filling with a single PBR configuration, according to an implementation of the present application. In the present implementation, a base station assigns two TTIs (e.g., $TTI_1$ and $TTI_2$) to a UE, but only configures a single PBR for the two TTIs. Upon receiving the TTIs and the single PBR, the UE makes a PBR division. As shown in FIG. 5, after the UE receives the single PBR configuration from the base station, the UE determines a division ratio between the two isolated token buckets (e.g., $\alpha$ for $TTI_1$ and $\beta$ for $TTI_2$, where $\alpha+\beta=1$). For example, the determination of $\alpha$ and $\beta$ can based on the logical channel's corresponding application traffic type, and the specific portion of MAC SDUs' needs on their respective latency requirements. The two isolated token buckets with their respective TTIs perform their own token filling operations independently by increasing ($\alpha$ or $\beta$)×PBR×$TTI_n$ tokens into their respective isolated token buckets at their respective $TTI_n$, where n is the numerology numbering.

As shown in FIG. 5, the total number of tokens in isolated token bucket 1 for logical channel j can be expressed as $B_{j1(t)}=B_{j1(t-1)}+(\alpha \times PBR \times TTI_1)$, while the total number of tokens in isolated token bucket 2 for logical channel j can be expressed as $B_{j2(t)}=B_{j2(t-1)}+(\beta \times PBR \times TTI_2)$, where j is the logical channel numbering. In the present implementation, isolated token buckets 1 and 2 have their respective $BSD_1$ and $BSD_2$. In the present implementation, $TTI_1$, $TTI_2$, PBR, $BSD_1$, and $BSD_2$ are configured by the base station. Although FIG. 5 only shows token filling operation of one logical channel, it should be understood that the UE may have multiple logical channels performing substantially similar functions as logical channel j. In another implementation, the base station may configure a common BSD (e.g. $BSD_{com}$) for the two isolated token buckets and restrict the total number of tokens the UE can hold for the two TTIs, where the sum of the total numbers of tokens in the isolated token buckets 1 and 2 cannot exceed $BSD_{com}$. It is noted that the division ratio $\alpha$ and $\beta$ may be different for each logical channel.

FIG. 6 is a schematic diagram of isolated token filling with two PBR configuration, according to an implementation of the present application. In the present implementation, a base station assigns two TTIs (e.g., $TTI_1$ and $TTI_2$) to a UE, and configures two corresponding PBRs (e.g., $PBR_1$ and $PBR_2$) for the two TTIs. The two TTIs perform their own token filling operations independently by increasing $PBR_n \times TTI_n$ tokens into their respective isolated token buckets at their respective $TTI_n$, where n is the numerology numbering.

As shown in FIG. 6, the total number of tokens in isolated token bucket 1 for logical channel j can be expressed as $B_{j1(t)}=B_{j1(t-1)}+(PBR_1 \times TTI_1)$, while the total number of tokens in isolated token bucket 2 for logical channel j can be expressed as $B_{j2(t)}=B_{j2(t-1)}+(PBR_2 \times TTI_2)$, where j is the logical channel numbering. In the present implementation, isolated token buckets 1 and 2 have their respective $BSD_1$ and $BSD_2$. In the present implementation, $TTI_1$, $TTI_2$, $PBR_1$, $PBR_2$, $BSD_1$, and $BSD_2$ are configured by the base station. Although FIG. 6 only shows token filling operation of one logical channel, it should be understood that the UE may have multiple logical channels performing substantially similar functions as logical channel j. In another implementation, the base station may configure a common BSD (e.g., $BSD_{com}$) for the two isolated token buckets and restrict the total number of tokens the UE can hold for the two TTIs, where the sum of the total numbers of tokens in the isolated token buckets 1 and 2 cannot exceed $BSD_{com}$. It is noted that the $PBR_n$ may be different for each logical channel.

It should be noted that FIGS. 5 and 6 only show the token filling mechanisms of the LCP operation. The token usage and SDU packing portions of the LCP operation will be discussed below with reference to FIGS. 7 and 8, respectively.

Based on the token filling with isolated token buckets described above, implementations of the present application provide three token usage operations, namely, priority token usage, dynamic token usage and specific token usage. Since the tokens for each numerology (e.g., TTI) are collected in isolated token buckets, the token usage from each token bucket for token usage can be managed independently.

Figure 7:
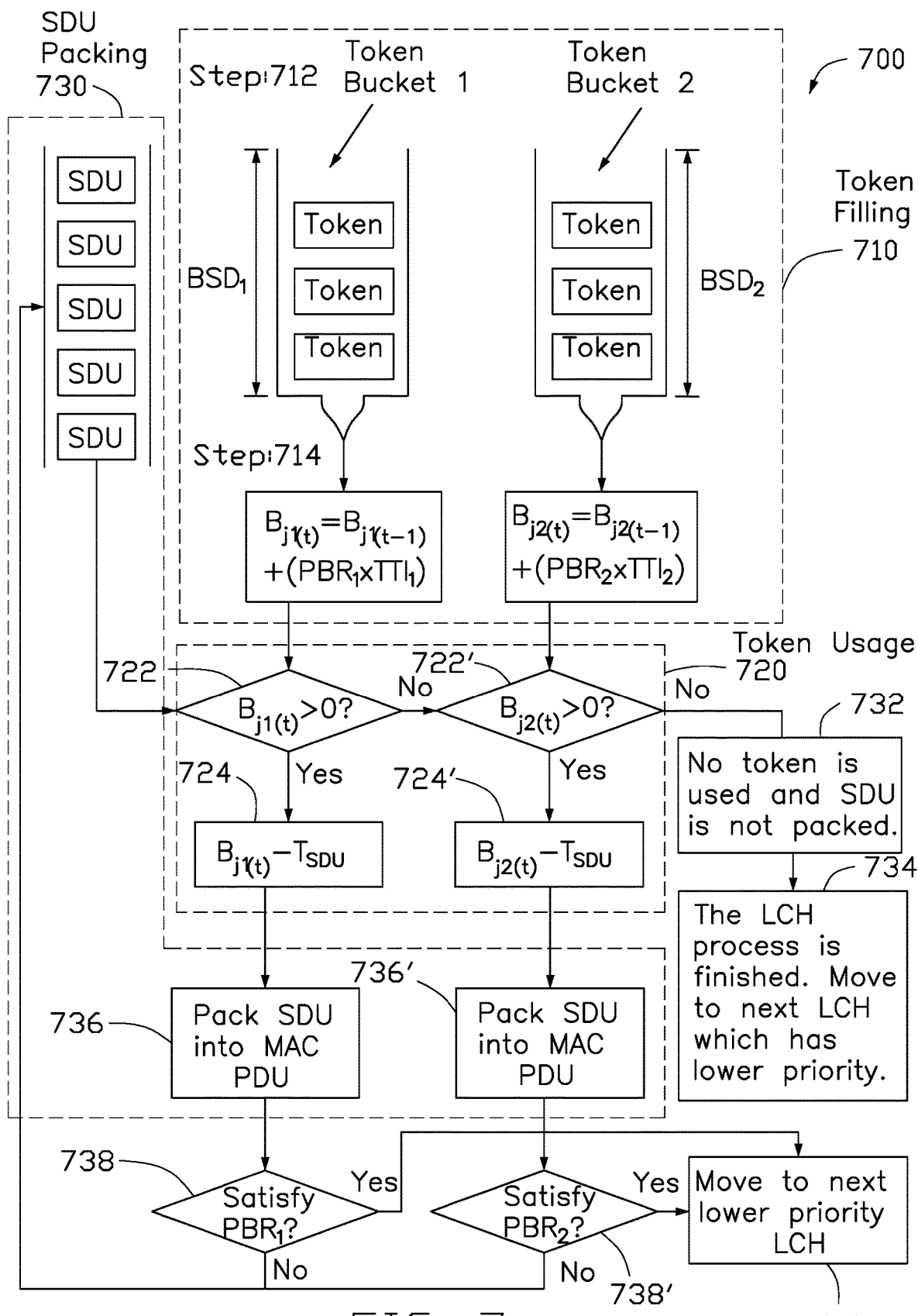
FIG. 7 is a diagram illustrating an LCP operation with priority token usage, according to an exemplary implementation of the present application.

FIG. 7 is a diagram showing an LCP operation with priority token usage according to one implementation of the present application. LCP operation 700A includes token filling 710, token usage 720, and SDU packing 730. In the present implementation, token filling 710 may substantially correspond to token filling 510 in FIG. 5. As shown in FIG. 7, the token usage for each isolated token bucket has a priority. The priority can be configured by the base station (e.g., gNB) explicitly, or decided by the UE itself implicitly. For example, the UE may decide the priority for each isolated token bucket based on numerology and running applications. When there is any SDU ready for transmission, the UE may use tokens based on the priority assignments (e.g., from the token bucket with the highest priority to the token bucket with the lowest priority).

In the present implementation, the tokens in isolated token bucket 1 has priority over isolated token bucket 2, thus will be used prior to token bucket 2. That is, the UE will use the tokens in isolated token bucket 2 only when it runs out all of the tokens from isolated token bucket 1. It is noted that the priority assignments may be respective for different logical channels, bearers, network slicing, core network slicing and radio access network slicing. The base station (e.g., gNB or eNB) may reconfigure the priority assignment via an MAC Control Element (CE) or via an RRC signaling.

It should be understood that steps 722, 724, 732, 734, 736, 738 and 740 are substantially similar to steps described 422, 424, 432, 434, 436, 438 and 440 in FIG. 4. As described above, the tokens in isolated token bucket 1 has priority over isolated token bucket 42, thus will be used prior to token bucket 2. That is, LCP operation 700 may perform steps 722, 724, 736, and 738 as long as there are tokens in isolated token bucket 1, and perform steps 722', 724', 736', and 738' only when isolated token bucket 1 runs out all of the tokens.

Figure 8:
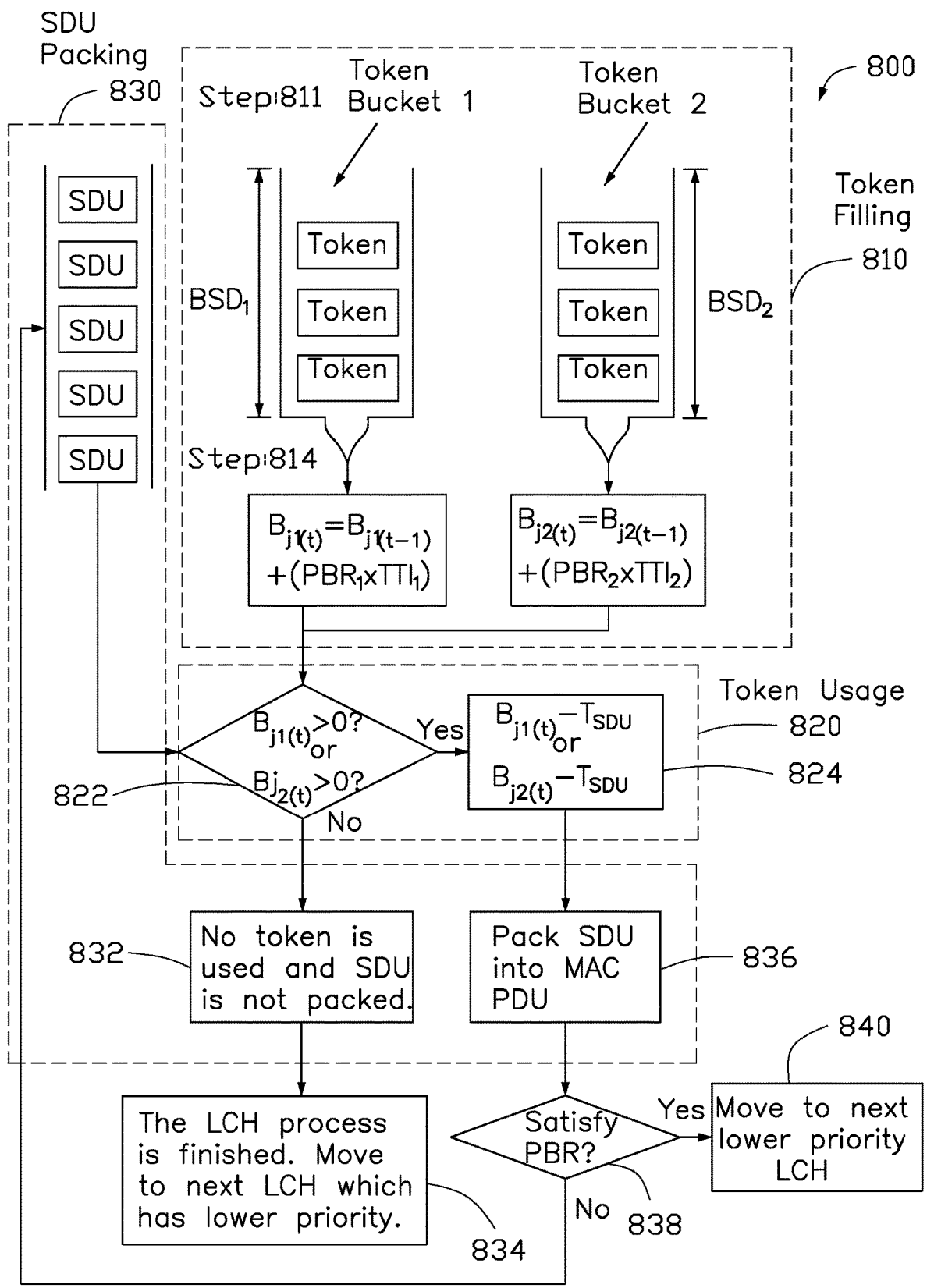
FIG. 8 is a diagram illustrating an LCP operation with dynamic token usage, according to an exemplary implementation of the present application.

FIG. 8 is a diagram showing an LCP operation with dynamic token usage according to one implementation of the present application. Different from priority token usage, the dynamic token usage of tokens in each isolated token bucket does not have priority. When there is any SDU ready for transmission, the UE can dynamically use the tokens in each of the isolated token buckets based on its needs and expectations.

In the present implementation, the decision of which token from the corresponding token bucket (e.g., isolated token bucket 1 or 2) will be used is made by the UE itself. For example, the decision can base on the latency requirement for MAC SDUs and the MAC SDU buffer queuing status. It should be understood that steps 822, 824, 832, 834, 836, 838, and 840 are substantially similar to steps described 422, 424, 432, 434, 436, 438 and 440 in FIG. 4. It is noted that depending on the decision of which isolated token bucket is to be used, step 822 and 824 may check the corresponding token bucket's bucket size to check if it is greater than 0 (e.g., $B_{j1(t)}>0$ or $B_{j2(t)}>0$), and then keep track of the token usage for the corresponding token bucket (e.g., $B_{j1(t)}-T_{SDU}$ or $B_{j2(t)}-T_{SDU}$). Also, it is noted that in the present implementation, the base station assigns two TTIs and two PBRs to the UE. As such, in step 838, the PBR may be the sum of $PBR_1$ and $PBR_2$ (e.g., $PBR=PBR_1+PBR_2$). In another implementation where the base station assigns a single PBR to the UE, then the LCP operation 800 uses the single PBR in step 838.

Figure 9:
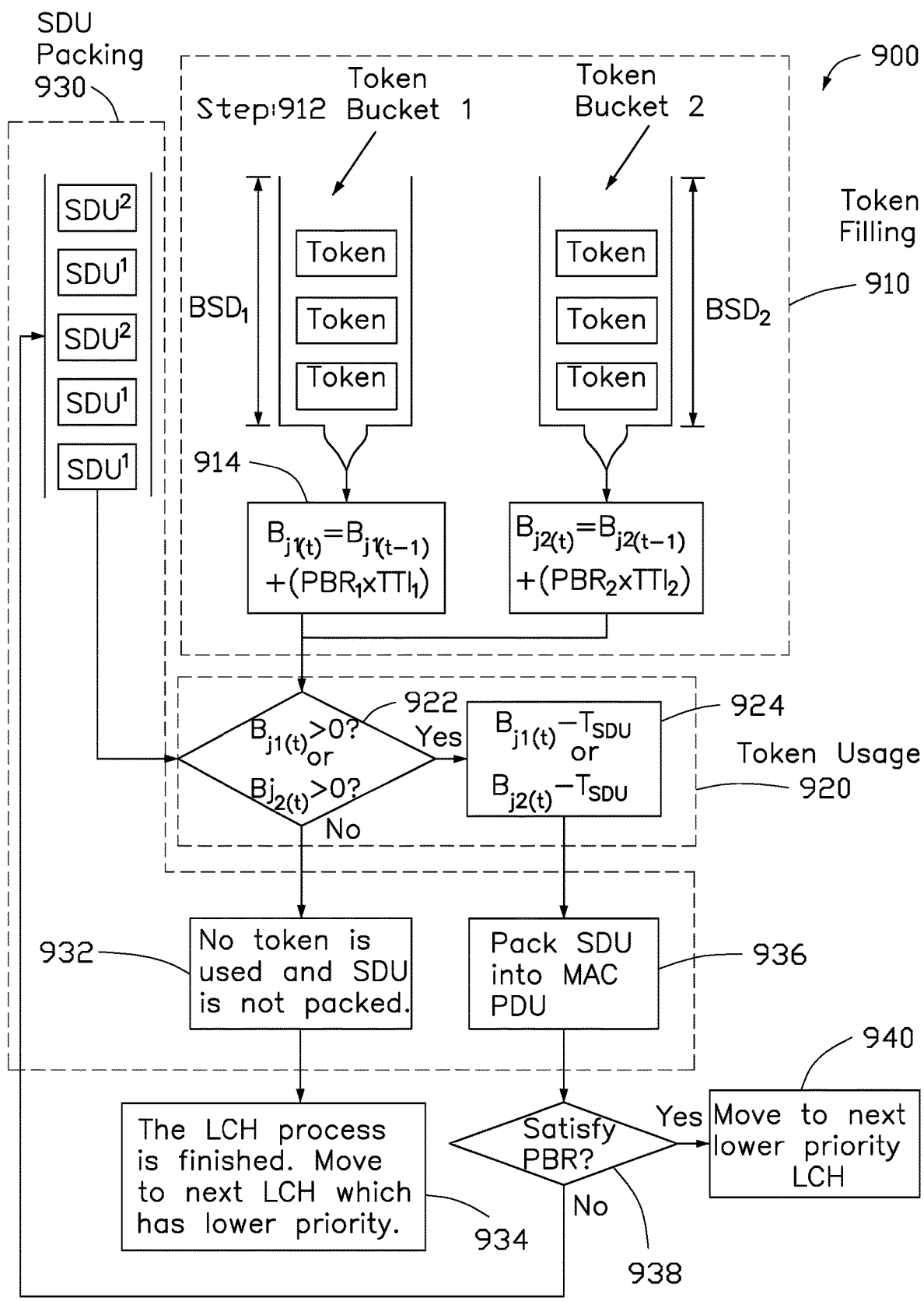
FIG. 9 is a diagram illustrating an LCP operation with specific token usage, according to an exemplary implementation of the present application.

FIG. 9 is a diagram showing an LCP operation with specific token usage according to one implementation of the present application. Similar to the priority token usage, the specific token usage of tokens in each isolated token bucket does not have priority. In this embodiment, the UE do not make decisions on which token of the corresponding token bucket (e.g., isolated token bucket 1 or 2) will be used. Instead, the UE follows an indicator from each SDU. The indicator indicates which token(s) or the token(s) from which token bucket (e.g., isolated token bucket 1 or 2) will be used in the SDU packing. For example, $SDU^1$ indicates that the tokens of the token bucket 1 will be used, and $SDU^2$ indicates that the tokens of the token bucket 2 will be used. The indicator can be an PDCP PDU header, RLC PDU header, logical channel ID, and can be assigned by RRC, NAS or an upper layer.

It should be understood that steps 922, 924, 932, 834, 936, 938, and 940 are substantially similar to steps described 422, 424, 432, 434, 436, 438 and 440 in FIG. 4. It is noted that depending on the decision of which isolated token bucket is to be used, step 922 and 924 may check the corresponding token bucket's bucket size to check if it is greater than 0 (e.g., $B_{j1(t)}>0$ or $B_{j2(t)}>0$), and then keep track of the token usage for the corresponding token bucket (e.g., $B_{j1(t)}-T_{SDU}$ or $B_{j2(t)}-T_{SDU}$). Also, it is noted that in the present implementation, the base station assigns two TTIs and two PBRs to the UE. As such, in step 938, the PBR may be the sum of $PBR_1$ and $PBR_2$ (e.g., $PBR=PBR_1+PBR_2$). In another implementation where the base station assigns a single PBR to the UE, then the LCP operation 900 uses the single PBR in step 938.

Figure 10:
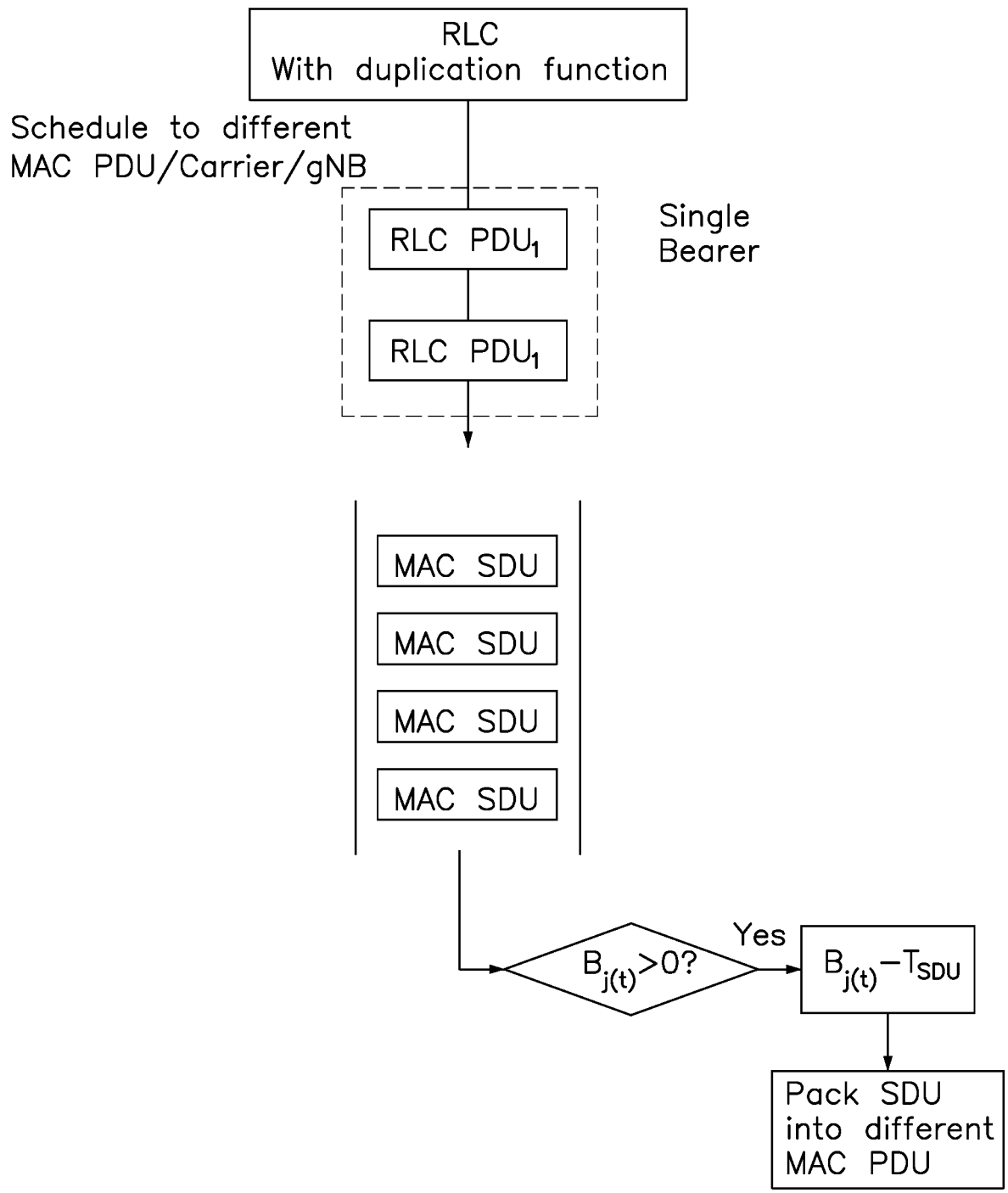
FIG. 10 is a diagram illustrating SDU packing with duplication of data packets in RLC layer, according to an exemplary implementation of the present application.

FIG. 10 is a schematic diagram SDU packing with duplication of data packets in RLC layer according to one embodiment of the present disclosure. In one embodiment, in order to achieve higher reliability on data packet transmission, a UE may duplicate the data packet either in the RLC layer, and transmit the duplicated data packets via different carriers and/or to different base stations. For example, to provide URLLC service, the UE may duplicate a data packet and place them in different SDUs for transmission. The SDU packing mechanisms are described below with respect to data duplication in the RLC layer with a single bearer.

As shown in FIG. 10, the RLC layer duplicates RLC PDUs into a single bearer, which implies that the LCP function may process these duplicated data packets from a single logical channel. The UE processes the LCP for these duplicated data packets by itself. It means that the UE can manage the usage of tokens from the single token bucket for the duplicated data packets.

The RLC layer mark the RLC PDUs (e.g., PDCP $PDU_1$s) to help the MAC layer to identify the RLC PDUs with duplicated data packets. As such, during the MAC SDU packing procedure, the MAC layer can avoid packing these duplicated data packets into a single MAC PDU by using the identities provided by the RLC. Otherwise, the duplicated data packets would be delivered in the same MAC PDU through the same carrier, which is undesirable for URLLC. In addition, MAC layer also can distinguish these duplicated PDCP PDUs by their logical channel IDs and/or RLC PDU duplication function on/off indication from upper layer or base station.

For data packet duplication operated by dual connectivity cases, a master base station (e.g., a Master gNB (MgNB)) is responsible to coordinate with a secondary base station (e.g., a secondary gNB (SgNB)), and transmit the associated LCP parameters (e.g., LCH priority, PBR, BSD, TTI, and etc.) to the UE. It is assumed that there must be a base station serving as a master base station that supports such kind of dual-connectivity operation.

It should be noted that the token filling operations described with respect to FIGS. 4-6, the token usage operations described with respect to FIGS. 7-9, and the SDU packing operations described with respect to FIG. 10, may be configured into any suitable combination to perform the LCP, according to implementations of the present application.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A method for ultra-reliable low-latency communications, the method comprising:
   receiving a plurality of logical channel prioritization (LCP) parameters corresponding to a first radio link control (RLC) bearer and a second RLC bearer,
   the LCP parameters comprising a prioritized bit rate, a bucket size duration, a logical channel priority, and a transmission time interval,
   a first portion of the LCP parameters corresponding to a first logical channel associated with the first RLC bearer, and
   a second portion of the LCP parameters corresponding to a second logical channel associated with the second RLC bearer;
   receiving, by a medium access control (MAC) entity, a first RLC data packet from the first RLC bearer and a second RLC data packet from the second RLC bearer, wherein:
   the first RLC data packet contains a first packet data convergence protocol (PDCP) packet data unit (PDU),
   the second RLC data packet contains a second PDCP PDU, and
   the first and second PDCP PDUs are marked by a PDCP entity for duplication identification in the MAC entity;
   determining, by the MAC entity, whether the first and second RLC data packets are duplicated RLC data packets by identifying the marked first and second PDCP PDUs respectively in the first and second RLC data packets; and
   responsive to a determination that the first and second RLC data packets are duplicated RLC data packets, packing the first RLC data packet and the second RLC data packet into different MAC data packets based on the first portion and the second portion of the LCP parameters, respectively.

2. The method of claim 1, wherein the LCP parameters are received from a first base station for duplication in dual-connectivity operations between the first base station and a second base station.

3. The method of claim 1, further comprising:
   receiving a duplication indicator in the MAC entity;
   wherein determining whether the first and second RLC data packets are duplicated RLC data packets comprises:
      determining whether the first and second RLC data packets are duplicated RLC data packets based on first and second logical channel identities and the duplication indicator in the MAC entity.

4. The method of claim 1, further comprising:
   maintaining two token buckets respectively for the first and second RLC bearers in response to receiving the plurality of LCP parameters.

5. The method of claim 1, wherein determining, by the MAC entity, whether the first and second RLC data packets are duplicated RLC data packets further comprises:
   determining, by the MAC entity, whether the first and second RLC data packets are duplicated RLC data packets based on first and second logical channel identities corresponding to the first and second logical channels.

6. The method of claim 1, wherein determining, by the MAC entity, whether the first and second RLC data packets are duplicated RLC data packets further comprises:
   determining, by the MAC entity, whether the first and second RLC data packets are duplicated RLC data packets based on first and second logical channel identities and a duplication indicator, the duplication indicator including a flag bit in a MAC header.

7. A user equipment (UE) for ultra-reliable low-latency communications, the UE comprising:
   a memory storing instructions; and
   a processor configured to execute the instructions to cause the UE to:
   receive a plurality of logical channel prioritization (LCP) parameters corresponding to a first radio link control (RLC) bearer and a second RLC bearer,
   the LCP parameters comprising a prioritized bit rate, a bucket size duration, a logical channel priority, and a transmission time interval,
   a first portion of the LCP parameters corresponding to a first logical channel associated with the first RLC bearer, and
   a second portion of the LCP parameters corresponding to a second logical channel associated with the second RLC bearer;

receive, by a medium access control (MAC) entity, a first RLC data packet from the first RLC bearer and a second RLC data packet from the second RLC bearer, wherein:
- the first RLC data packet contains a first packet data convergence protocol (PDCP) packet data unit (PDU),
- the second RLC data packet contains a second PDCP PDU, and
- the first and second PDCP PDUs are marked by a PDCP entity for duplication identification in the MAC entity;

determine, by the MAC entity, whether the first and second RLC data packets are duplicated RLC data packets by identifying the marked first and second PDCP PDUs; and responsive to a determination that the first and second RLC data packets are duplicated RLC data packets, pack the first RLC data packet and the second RLC data packet into different MAC data packets based on the first portion and the second portion of the LCP parameters, respectively.

8. The UE of claim 7, wherein the processor is configured to execute the instructions to cause the UE to receive the LCP parameters from a first base station for duplication in dual-connectivity operations between the first base station and a second base station.

9. The UE of claim 7, wherein the processor is further configured to execute the instructions to cause the UE to:
receive a duplication indicator in the MAC entity;
wherein the processor is configured to execute the instructions to cause the UE to determine whether the first and second RLC data packets are duplicated RLC data packets based on first and second logical channel identities and the duplication indicator in the MAC entity.

10. The UE of claim 7, wherein the processor is further configured to execute the instructions to cause the UE to:
maintain two token buckets respectively for the first and second RLC bearers in response to receiving the plurality of LCP parameters.

11. The UE of claim 7, wherein the processor is configured to execute the instructions to cause the UE to determine, by the MAC entity, whether the first and second RLC data packets are duplicated RLC data packets based on first and second logical channel identities corresponding to the first and second logical channels.

12. The UE of claim 7, wherein the processor is configured to execute the instructions to cause the UE to determine, by the MAC entity, whether the first and second RLC data packets are duplicated RLC data packets based on first and second logical channel identities and a duplication indicator, the duplication indicator including a flag bit in a MAC header.

* * * * *